United States Patent [19]

MacAnally

[11] Patent Number: 4,982,395
[45] Date of Patent: Jan. 1, 1991

[54] COMPOSITE OPTICAL GRATING FOR OPTICAL DISK DATA STORAGE SYSTEMS

[75] Inventor: Richard B. MacAnally, Boulder, Colo.

[73] Assignee: Storage Technology Partners II, Denver, Colo.

[21] Appl. No.: 252,745

[22] Filed: Oct. 3, 1988

[51] Int. Cl.$^5$ .............................................. G11B 7/00
[52] U.S. Cl. .................................................. 369/44.37
[58] Field of Search ............... 350/162.17; 369/44–46, 369/109, 110, 112, 44.37, 44.38

[56] References Cited

U.S. PATENT DOCUMENTS

| | | | |
|---|---|---|---|
| 4,167,024 | 9/1979 | Hamisch | 369/110 |
| 4,449,212 | 5/1984 | Reno | 369/112 |
| 4,532,522 | 7/1985 | Tsunoda et al. | 369/109 |
| 4,598,393 | 7/1986 | Pierce et al. | 369/109 |
| 4,633,455 | 12/1986 | Hudson | 369/45 |
| 4,720,825 | 1/1988 | Kokado | 369/109 |

FOREIGN PATENT DOCUMENTS 53-20904 2/1978 Japan ................................. 369/109

*Primary Examiner*—Donald McElheny, Jr.
*Attorney, Agent, or Firm*—Dorr, Carson, Sloan & Peterson

[57] ABSTRACT

The composite optical grating for optical disk data storage systems uses a first optical grating to generate three light beams disposed approximately on a straight line. A second optical grating in the composite optical grating is juxtaposed with the first optical grating and divides the three light beams into two images, each consisting of a three spot array. The first of these images is focused on a first data storage track while the second image of three spots is focused on a second adjacent data storage track. The three spot array formed on the first track is used in conventional fashion to read data from this data storage track. The center spot is used to read the data from the data storage track while the two outer linearly oriented spots are used for tracking purposes. The second image formed by the second optical grating is focused on a second adjacent data storage track and only the center spot of the three spot array is used to read data from the second data storage track. The adjacent outer spots in the second image are not used although they are available for use for tracking purposes.

16 Claims, 1 Drawing Sheet

COMPOSITE OPTICAL GRATING FOR OPTICAL DISK DATA STORAGE SYSTEMS

FIELD OF THE INVENTION

This invention relates to optical disk data storage systems and, in particular, to apparatus that generates two read beams as well as two tracking beams all from a single laser beam to concurrently read data from two adjacent data storage tracks on the optical disk.

PROBLEM

It is a problem in the field of optical disk data storage systems to concurrently read data from two adjacent data tracks. Existing optical disk read apparatus use an adjustable optical grating to generate three light beams from a single laser beam. The three light beams pass through various optical elements which focus the three light beams into three luminous spots disposed along a straight line located on the optical disk data surface. The position of the three luminous spots on the optical disk data surface can be rotated relative to the tangent to a data storage track by rotating the optical grating about an axis parallel to the incident laser beam. The central luminous spot of the three luminous spots provides scanning of a data storage track with respect to the information contained therein. It may also provide information necessary to maintain focus of the light beams upon the data surface of the optical disk.

The two outer luminous spots provide information necessary to maintain the central luminous spot located on the scanned data storage track by the action of a tracking servo. The light from the two outer luminous spots, is reflected by the data surface of the optical disk, and is captured by two photo detectors. The signals thereby obtained are used by the tracking servo to control the tilt of an electrically controlled galvanometer mirror in such a manner as to maintain the central luminous spot located on the center of the scanned data storage track.

In the system outlined above, the three beam optical disk read apparatus reads only a single data storage track at a time. It is possible to devise systems in which the three beam optical disk read apparatus reads two adjacent data tracks at a time, but these systems entail loss of performance or increased complexity of the apparatus.

In one such system, the center spot lies upon one data storage track, and the grating is rotated so that the two outer luminous spots lie upon the two data storage tracks adjacent to and on either side of the first data storage track. In another system, adjacent data storage tracks are separated by interposed servo tracks. The three focused luminous spots are shifted so that the center spot lies upon a servo track and the grating is rotated so that the two outer luminous spots lie one each upon the two data storage tracks adjacent to and on either side of the servo track.

There are substantial practical difficulties with both of these systems for concurrently reading two adjacent data storage tracks. First, the central spot is used for generating the information for tracking. Thus, both of these systems suffer all of the problems associated with single spot optical disk tracking systems. These problems are difficult or impossible to overcome in practical systems for reading optically stored data. Second, in both of these systems the data storage tracks are read by the outer spots of the three spot array. Because these spots are near the edge of the field of view of the focusing lens, they are of degraded optical quality. Consequently, the corresponding data signal read back from the data storage track is subject to errors. A focusing lens of very large field of view can be used to improve the optical quality of the outer spots but this entails an unacceptable increase in the size, weight, complexity and cost for this lens.

Another system configuration generates more than three spots to concurrently read two data storage tracks. In these systems, either the read apparatus that generates the three spots is duplicated in its entirety, with each set of three spots focused on a corresponding data storage track as described above, or multiple laser sources are obtained from beam splitters or multiple lasers. These systems are inefficient, complex and costly.

Therefore, in optical disk data storage systems existing methods for reading data concurrently from two adjacent data storage tracks are complex or lead to a loss of data integrity through poor optical performance or reduced tracking accuracy and reliability.

SOLUTION

The foregoing problems are solved and a technical advance achieved in the field of optical disk data storage systems by the composite optical grating for optical disk systems that generates an extra light beam solely for the purpose of concurrently reading data from two optical disk data storage tracks. The composite optical grating generates a plurality of spots from a single laser beam in a two dimensional array. Two of the spots are used for tracking purposes while two of the spots are used to concurrently read data from adjacent data storage tracks on the optical disk.

The composite optical grating for optical disk data storage systems uses an incident laser beam applied to a first optical grating to generate three light beams disposed approximately on a straight line. A second optical grating in the composite grating duplicates the three light beams into two images, each consisting of a three spot array. The first of these images consists of three light beams focused into three luminous spots on a first data storage track. The second image consists of three light beams focused into three luminous spots on a second data storage track located adjacent to the first data storage track. The first image consisting of a three spot array formed on the first data storage track is used in a conventional fashion to read data from this data storage track. The center spot is used to read the data from the data storage track while the two outer linearly oriented spots are used for tracking purposes. The second image consisting of a three spot array formed by the second grating is focused on a second adjacent data storage track and there only the center spot of the three spot array is used to read data from the second data storage track. The two outer spots in the second three spot image are not used, although they are available for tracking purposes.

This system makes use of a single laser beam and two simple optical gratings to generate a plurality of spots to concurrently read data stored on two adjacent data storage tracks while also providing two tracking spots for alignment purposes. Thus, a single laser beam is all that is required to concurrently read data from two adjacent data storage tracks on the optical disk. This eliminates the complexity found in prior art optical disk systems and provides improved accuracy over the prior art system that uses only a single tracking beam. These and other advantages of the present invention are disclosed in the following specification.

DETAILED DESCRIPTION OF THE DRAWINGS

In conventional optical disk data storage systems, the stored information contained in each data storage track is retrieved by scanning a microscopic-sized luminous spot along the data storage track. This light spot is usually derived from a laser source and must be precisely positioned in the center of the data storage track as well as accurately focused upon the surface of the optical disk. However, due to mechanical warping of the optical disk surface, production tolerances in the geometry of the data storage tracks, and mechanical wobble and runout of the spindle, the position of a data storage track with respect to the read spot varies minutely from instant to instant. Therefore, a light beam tracking apparatus is required to maintain the correct centering of the data read spot with respect to the data storage track. In conventional optical disk data storage systems, this feature is provided by a tracking servo which derives its input error signal from two additional light spots which are positioned in a straight line on either side of the read spot and tangent to the data storage track. This one dimensional array of three light spots is generated by placing an optical grating, usually a transmission grating, in the optical path between a laser source and a focusing objective lens.

This system is adequate for reading a single data storage tracks. However, in high performance optical disk data storage systems, there is a need to read more than one data storage track at a time either for data verification purposes or to increase the effective data transfer rate. For these applications the conventional one dimensional three spot array is inadequate. In order to concurrently read two adjacent data storage tracks, the most common requirement for high performance optical disk data storage systems, a minimum of four spots positioned in a two dimensional array are required, two for reading the adjacent data storage tracks and two for tracking. However, a simple optical grating with the precision and optical quality required for use in optical disk data storage systems is not readily made in a form which will generate the required two dimensional array of spots.

Composite Grating

Figure 1:
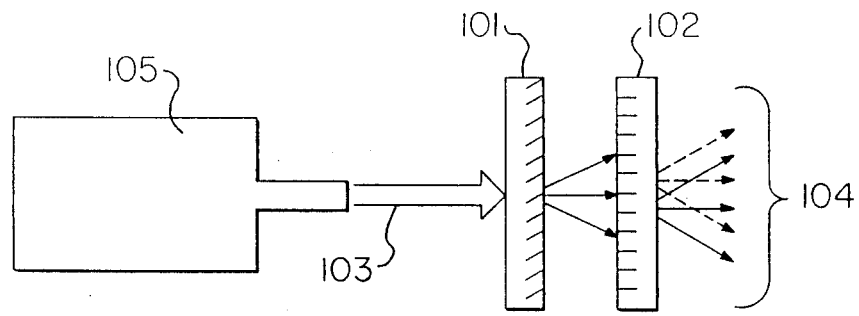
FIG. 1 illustrates the composite optical grating for optical disk data storage systems.
Figure 2:
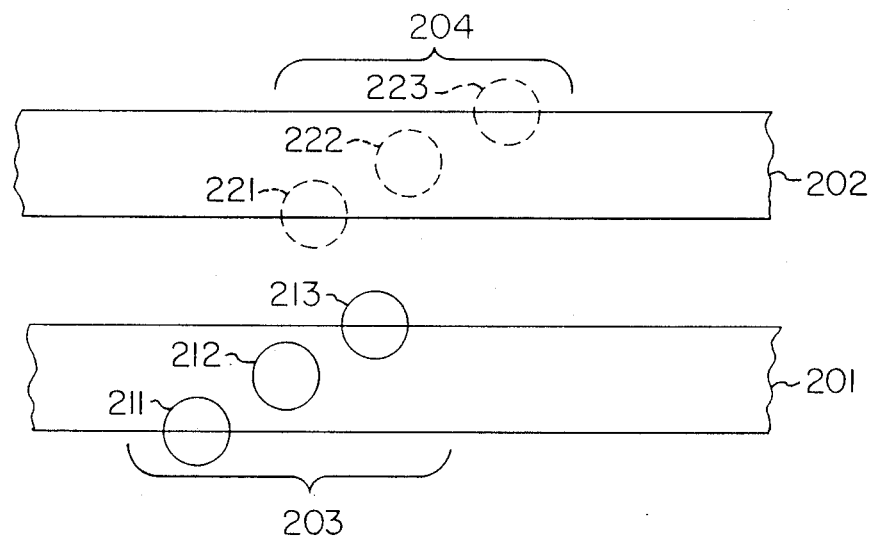
FIG. 2 illustrates the beam pattern produced by the composite optical grating for optical disk data storage systems.

The composite optical grating for optical disk data storage systems illustrated in FIG. 1 provides the apparatus required to generate four or more spots in a two dimensional array for concurrently reading two or more adjacent data storage tracks. This apparatus includes a laser 105 which generates a coherent beam of light 103 which is applied to a composite optical grating consisting of two juxtaposed optical gratings 101, 102. Optical grating 101 is a conventional optical transmission grating with balanced +1 and −1 orders that splits the incoming light beam 103 into three light beams to generate the three spots illustrated in FIG. 2 as 211, 212 and 213. This is the conventional apparatus that generates a read spot and two tracking spots from a single incoming beam of coherent light 103. In order to produce an additional read spot for reading the adjacent data storage track 202, optical transmission grating 102, which is blazed to yield only a zero order and a +1 order, is added in juxtaposed position to optical grating 101. Optical grating 102 functions to split the three output light beams of optical grating 101 into two images comprising two sets of three light beams which are focused by a focusing objective lens into two dimensional array of spots. In particular, optical grating 102 replicates the three light beam array formed by the first optical grating and therefore produces a two dimensional array consisting of six spots onto the optical disk recording surface of the recording medium. These six spots consist of two images of the original three spot array each of which is focused on one of the adjacent data storage tracks 201, 202. Thus, one image is a three spot array consisting of read spot 212 and two adjacent tracking spots 211, 213 focused on data storage track 201. The second image is a three spot array that consists of a read spot 222 and its two adjacent tracking spots 221, 223 which spots are focused on data storage track 202. Thus, the composite optical grating consisting of optical gratings 101 and 102 produces the required two data storage track read spots 212, 222 as well as two tracking spots 211, 213 for compensating for misalignment of the read apparatus with respect to the data storage tracks. Tracking spots 221, 223 are not used in this arrangement since tracking is provided by tracking spots 211, 213 although tracking spots 221, 223 can be used to provide additional tracking data for data storage track 202. Thus, the composite optical grating for optical disk data storage systems makes use of a single laser which produces a single coherent beam of light 103 and a pair of optical gratings 101, 102 arranged in juxtaposed position to each other to produce a two dimensional array of spots consisting of four or more spots for concurrently reading two adjacent data storage tracks on an optical disk data storage system.

While a specific embodiment of the invention has been disclosed, it is expected that those skilled in the art can and will implement variations of the preferred embodiment disclosed therein, which variations still fall within the scope of the appended claims.

I claim:

1. In an optical disk data storage system that includes read apparatus for reading data stored on data storage tracks of an optical disk, where said data storage tracks consist of a plurality of concentric rings of data written on said optical disk, said read apparatus including:
    means for generating a beam of laser light;
    means for splitting said beam of laser light into four or more beams;
    means for focusing first and second ones of said four or more beams on one of said data storage tracks for tracking purposes;
    means for focusing a third one of said four or more beams on said one data storage track;
    means for focusing a fourth one of said four or more beams on the one of said data storage track adjacent to said one data storage track;
    means for reproducing data concurrently from said one data storage track and from said data storage track adjacent to said one data storage track by the reflection of said third beam off of said one of said data storage track and the reflection of said fourth beam off of said adjacent data storage track; and means for reading said reproduced data concurrently from said adjacent data storage tracks.

2. The apparatus of claim 1 wherein said splitting means includes:

means for dividing said beam of laser light into three light beams disposed approximately in a straight line.

3. The apparatus of claim 2 wherein said splitting means further includes:

means juxtaposed to said dividing means for duplicating said three light beams into two row of images, each row containing three spots disposed approximately in a straight line.

4. The apparatus of claim 2 wherein said dividing means comprises an optical transmission grating with +1 and −1 orders.

5. The apparatus of claim 3 wherein said duplicating means comprises an optical transmission grating with 0 and +1 orders.

6. In an optical disk data storage system that includes read apparatus for reading data stored on data storage tracks of an optical disk, where said data storage tracks consist of a plurality of concentric rings of data written on said optical disk, a method of concurrently reading data from two adjacent data storage tracks comprising the steps of:

splitting a single laser beam into four or more beams of light;

focusing two of said four or more beams of light on said adjacent data storage tracks for tracking purposes and two other of said four or more beams of light on said adjacent data storage tracks to concurrently read data therefrom by concurrently reproducing data from said adjacent data storage tracks from the reflections of said two other of said four more beams off of said adjacent data storage tracks and then concurrently reading said reproduced data.

7. The method of claim 6 wherein said step of focusing includes:

applying three of said beams of light, disposed approximately in a straight line, on a first one of said two adjacent data storage tracks.

8. The method of claim 7 wherein said step of focusing further includes:

applying one of said four or more beams of light to a second one of said two adjacent data storage tracks to reproduce data therefrom.

9. The method of claim 6 wherein said step of splitting includes the step of:

dividing said single laser beam into three beams of light, disposed approximately in a straight line.

10. The method of claim 9 wherein said step of splitting further includes the step of:

duplicating said three beams of light into two row of images, each row containing three spots of light disposed approximately in a straight line.

11. The method of claim 10 wherein said step of focusing includes the step of:

applying a first one of said images to a first one of said two adjacent data storage tracks.

12. The method of claim 11 wherein said step of focusing further includes the step of:

applying a second one of said images to a second one of said two adjacent data storage tracks.

13. In an optical disk data storage system that includes read apparatus for reading data stored on data storage tracks of an optical disk, where said data storage tracks consist of a plurality of concentric rings of data written on said optical disk, a method of concurrently reading data from two adjacent data storage tracks comprising the steps of:

splitting a single laser beam into three beams of light disposed approximately in a straight line;

dividing said three beams of light into two rows of images, each row containing three spots of light disposed approximately in a straight line;

applying a first row of said two rows of images, to a first one of said two adjacent data storage tracks;

applying a second rows of said two rows of images to a second one of said two adjacent data storage tracks;

concurrently reproducing the data from said two adjacent data storage tracks by the reflection of said first row of images off of said first data storage track and the reflection of said second row of images off of said second data storage track; and concurrently reading said reproduced data from said two adjacent storage tracks.

14. In an optical disk data storage system that includes read apparatus for reading data stored in data storage tracks of an optical disk, where said data storage tracks consist of a plurality of concentric rings of data written on said optical disk, apparatus for concurrently reading two adjacent data storage tracks comprising:

means for generating a single laser beam;

means for dividing said single laser beam into three beams of light disposed approximately in a straight line;

means for splitting said three beams of light into two rows of images, each row containing three spots of light disposed approximately in a straight line;

means for focusing a first row of said two rows of images on a first one of said two adjacent data storage tracks;

means for focusing a second row of said two rows of images on a second one of said two adjacent data storage tracks;

means for concurrently reproducing data from said two adjacent data storage tracks by the reflection of said first row of images off of said first data storage track and the reflection of said second row of images off of said second data storage track; and means for concurrently reading said reproduced data from said adjacent data storage tracks.

15. The apparatus of claim 14 wherein said means comprises an optical transmission grating having +1 and −1 orders.

16. The apparatus of claim 14 wherein said splitting means comprises an optical transmission grating having 0 and +1 orders.

* * * * *